(12) United States Patent
Cecil

(10) Patent No.: US 6,257,032 B1
(45) Date of Patent: Jul. 10, 2001

(54) REAR MOUNTED SPARE TIRE LOCK

(76) Inventor: Dwight Cecil, 1309 S. 48th Ct., Cicero, IL (US) 60804

( * ) Notice: Subject to any disclaimer, the term of this patent is extended or adjusted under 35 U.S.C. 154(b) by 0 days.

(21) Appl. No.: 09/535,038

(22) Filed: Mar. 24, 2000

(51) Int. Cl.[7] .................................................. E05B 65/12
(52) U.S. Cl. .................................. 70/259; 70/56; 70/260; 70/417
(58) Field of Search .................... 70/259, 260, 54–56, 70/417, 225, 226, 227; 224/42.21, 42.25

(56) References Cited

U.S. PATENT DOCUMENTS

| | | | | |
|---|---|---|---|---|
| 1,384,982 | * | 7/1921 | Walker | 70/260 |
| 1,423,194 | * | 7/1922 | Corbett | 70/260 |
| 1,425,817 | * | 8/1922 | Wasserfallen | 70/260 |
| 1,491,691 | * | 4/1924 | Godshalk | 70/260 |
| 1,500,849 | * | 7/1924 | Rudolph | 70/260 |
| 1,570,477 | * | 1/1926 | Godshalk | 70/260 |
| 1,571,057 | * | 1/1926 | Kroll | 70/260 |
| 1,588,721 | * | 6/1926 | Flintham | 70/260 |
| 1,618,997 | * | 3/1927 | Radandt | 70/260 |
| 1,627,259 | * | 5/1927 | Troast | 70/260 |
| 1,635,711 | * | 7/1927 | Fraim | 70/260 |
| 4,282,995 | * | 8/1981 | Austin | 70/54 X |
| 4,526,021 | * | 7/1985 | Princell | 70/259 X |
| 4,751,833 | * | 6/1988 | Stumpf, Jr. | 70/259 |
| 4,878,366 | * | 11/1989 | Cox | 70/226 X |
| 4,998,422 | * | 3/1991 | Borgmann et al. | 70/38 A |
| 5,060,912 | * | 10/1991 | Guarr | 254/323 |
| 5,303,569 | * | 4/1994 | Wright | 70/259 |
| 5,426,963 | * | 6/1995 | Tafoya et al. | 70/259 |
| 5,718,411 | * | 2/1998 | Baughan et al. | 254/323 |

FOREIGN PATENT DOCUMENTS

| | | | | |
|---|---|---|---|---|
| 969993 | * | 6/1975 | (CA) | 70/54 |
| 515977 | * | 4/1921 | (FR) | 70/259 |
| 1254523 | * | 11/1971 | (GB) | 70/54 |

* cited by examiner

Primary Examiner—Lloyd A. Gall
(74) Attorney, Agent, or Firm—Goldstein Law Offices P.C.

(57) ABSTRACT

A rear mounted spare tire lock including an angle iron positionable over the mounting aperture of the spare tire. A padlock is coupled with respect to the angle iron. The padlock includes a shackle portion and a locking portion. The padlock is extendable through the mounting aperture of the spare tire and extending through the aperture of the mounting bracket for securing to the mounting bracket in a locked orientation.

2 Claims, 2 Drawing Sheets

REAR MOUNTED SPARE TIRE LOCK

BACKGROUND OF THE INVENTION

The present invention relates to a rear mounted spare tire lock and more particularly pertains to preventing the theft of a spare tire that is mounted on the back of a vehicle.

The use of vehicle anti-theft devices is known in the prior art. More specifically, vehicle anti-theft devices heretofore devised and utilized for the purpose of preventing theft are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,426,963 to Tafoya discloses a spare tire locking device capable of being inserted through the spare tire access hole and being secured with a padlock. U.S. Pat. No. 4,282,995 to Austin discloses a spare tire lock comprised of a bracket assembly allowing the shackle of a padlock to pass through a slot in the bracket. U.S. Pat. Nos. 5,060,912 to Guarr and 5,718,411 to Baughan disclose additional anti-theft device for vehicle spare tires.

While these devices fulfill their respective, particular objective and requirements, the aforementioned patents do not describe a rear mounted spare tire lock for preventing the theft of a spare tire that is mounted on the back of a vehicle.

In this respect, the rear mounted spare tire lock according to the present invention substantially departs from the conventional concepts and designs of the prior art, and in doing so provides an apparatus primarily developed for the purpose of preventing the theft of a spare tire that is mounted on the back of a vehicle.

Therefore, it can be appreciated that there exists a continuing need for a new and improved rear mounted spare tire lock which can be used for preventing the theft of a spare tire that is mounted on the back of a vehicle. In this regard, the present invention substantially fulfills this need.

SUMMARY OF THE INVENTION

In the view of the foregoing disadvantages inherent in the known types of vehicle anti-theft devices now present in the prior art, the present invention provides an improved rear mounted spare tire lock. As such, the general purpose of the present invention, which will be described subsequently in greater detail, is to provide a new and improved rear mounted spare tire lock which has all the advantages of the prior art and none of the disadvantages.

To attain this, the present invention essentially comprises an angle iron positionable over the mounting aperture of the spare tire. The angle iron has an inner surface and an outer surface. The inner surface defines an interior of an angle. The outer surface defines an exterior of an angle. The angle iron is positionable with the inner surface facing the mounting aperture of the spare tire. A padlock is coupled with respect to the angle iron. The padlock includes a shackle portion and a locking portion. The shackle portion has an inverted U-shaped configuration defined by a pair of vertical segments and an arched upper segment. The pair of vertical segments each have lower ends. The lower end of a first vertical segment is fixedly coupled to the locking portion. The lower end of a second vertical segment is removably coupled with the locking portion. The first vertical segment is secured to the inner surface of the angle iron. The padlock is extendable through the mounting aperture of the spare tire with the second vertical segment extending through the aperture of the mounting bracket for securing to the mounting bracket in a locked orientation.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved rear mounted spare tire lock which has all the advantages of the prior art vehicle anti-theft devices and none of the disadvantages.

It is another object of the present invention to provide a new and improved rear mounted spare tire lock which may be easily and efficiently manufactured and marketed.

It is a further object of the present invention to provide a new and improved rear mounted spare tire lock which is of durable and reliable construction.

An even further object of the present invention is to provide a new and improved rear mounted spare tire lock which is susceptible of a low cost of manufacture with regard to both materials and labor, and which accordingly is then susceptible of low prices of sale to the consuming public, thereby making such a rear mounted spare tire lock economically available to the buying public.

Even still another object of the present invention is to provide a new and improved rear mounted spare tire lock for preventing the theft of a spare tire that is mounted on the back of a vehicle.

Lastly, it is an object of the present invention to provide a new and improved rear mounted spare tire lock including an angle iron positionable over the mounting aperture of the spare tire. A padlock is coupled with respect to the angle iron. The padlock includes a shackle portion and a locking portion. The padlock is extendable through the mounting aperture of the spare tire and extending through the aperture of the mounting bracket for securing to the mounting bracket in a locked orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
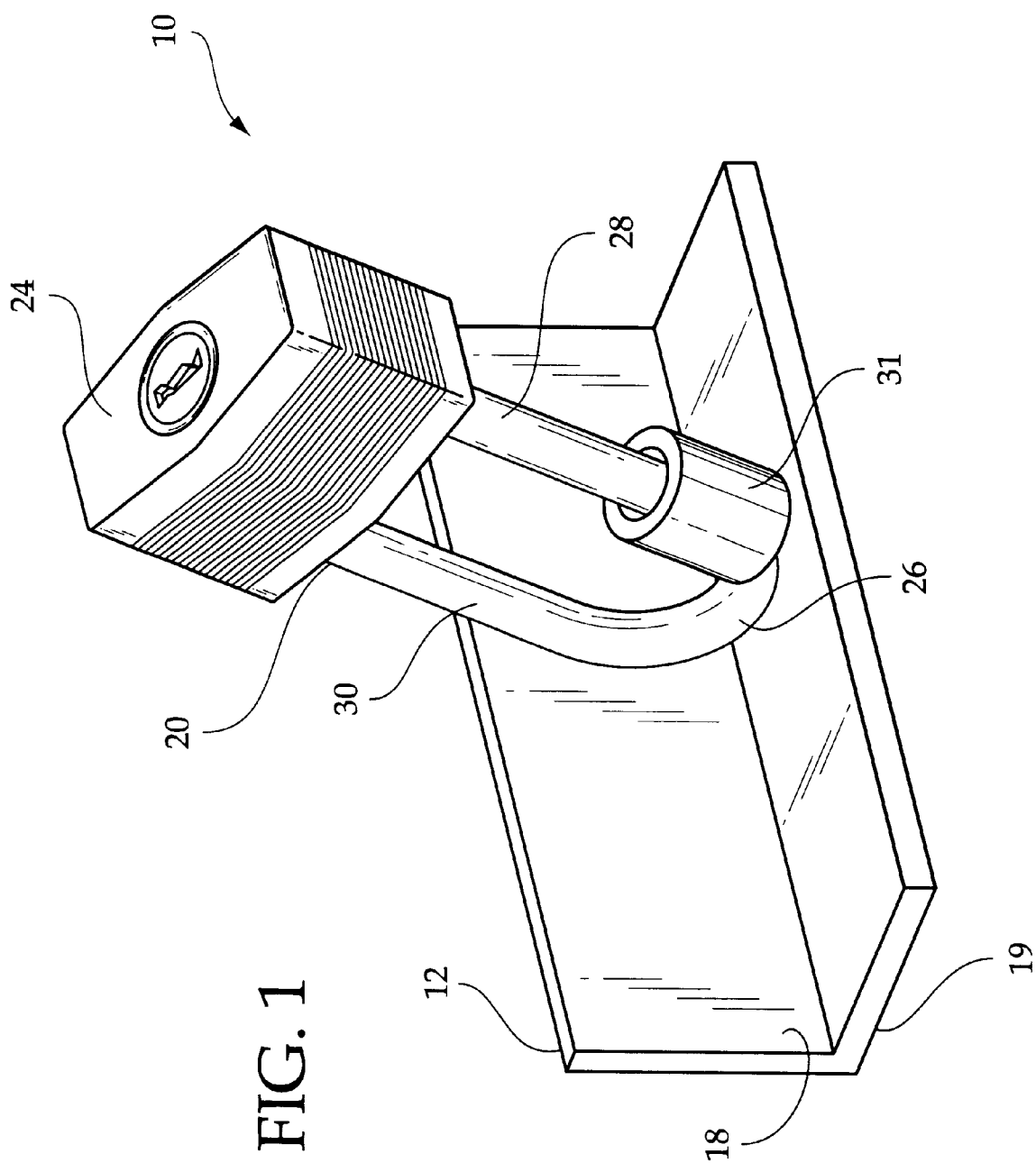
FIG. 1 is a perspective view of the preferred embodiment of the rear mounted spare tire lock constructed in accordance with the principles of the present invention.
Figure 3:
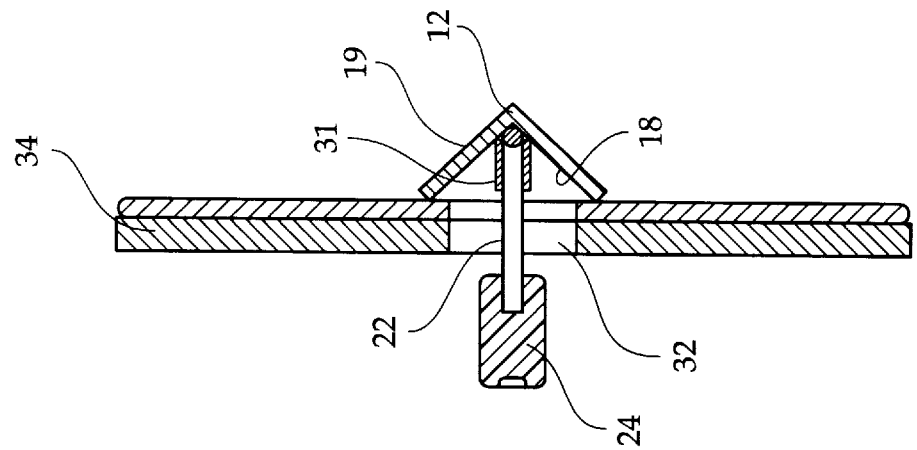
FIG. 3 is a cross-sectional view of the present invention as taken along line 3—3 of FIG. 2.
Figure 2:
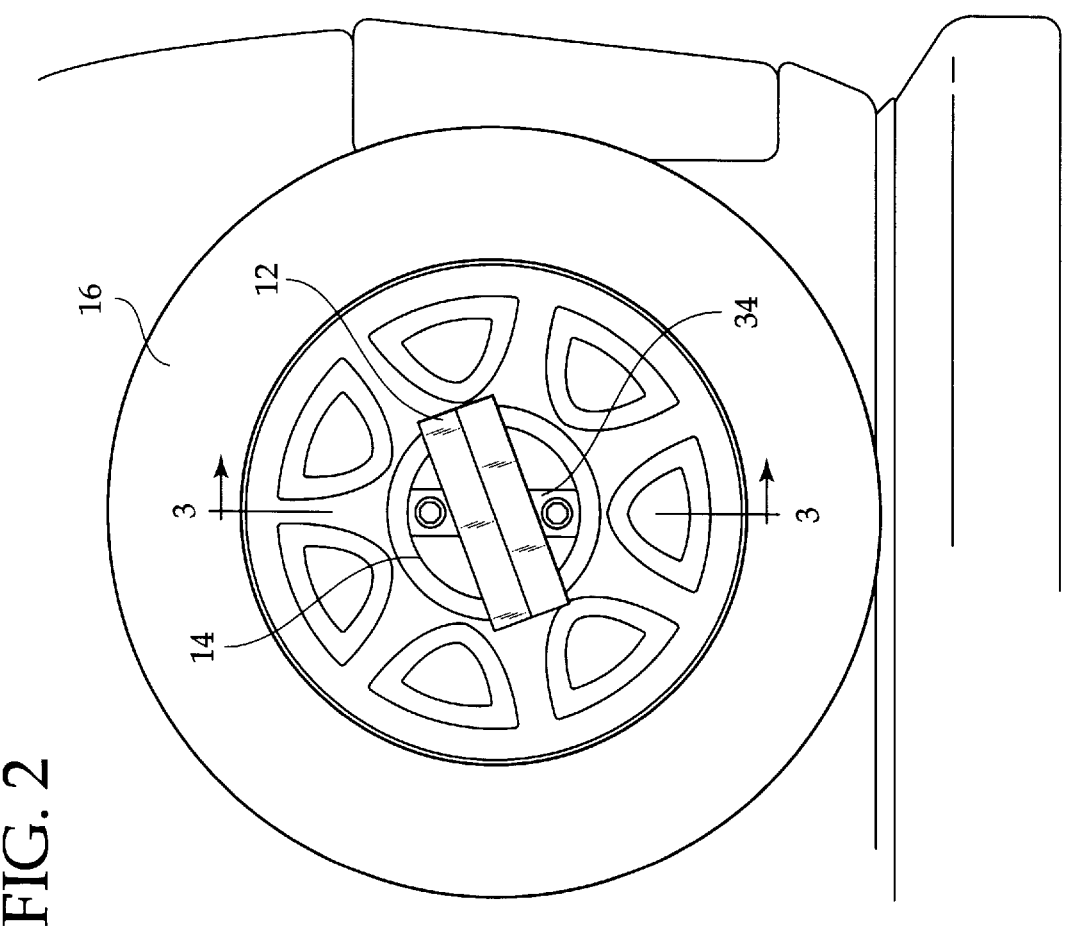
FIG. 2 is a front view of the present invention illustrated in use.

With reference now to the drawings, and in particular, to FIGS. 1 through 3 thereof, the preferred embodiment of the new and improved rear mounted spare tire lock embodying the principles and concepts of the present invention and generally designated by the reference number 10 will be described.

Specifically, it will be noted in the various Figures that the device relates to a rear mounted spare tire lock for preventing the theft of a spare tire that is mounted on the back of a vehicle. In its broadest context, the device consists of an angle iron and a padlock. Such components are individually configured and correlated with respect to each other so as to attain the desired objective.

The present invention use is primarily designed for use with a spare tire that is mounted to the back of the vehicle through a mounting bracket. The spare tire has a central mounting aperture. The mounting bracket has an aperture that aligns with the central mounting aperture.

The primary component of the present invention is an angle iron 12. The preferred angle iron has a length of either two or three inches. Alternatively, the angle iron can be replaced by either a six inch flat stock or a six inch round plate. The angle iron 12 is positionable over the mounting aperture 14 of the spare tire 16. The angle iron 12 has an inner surface 18 and an outer surface 19. The inner surface 18 defines an interior of an angle. The outer surface 19 defines an exterior of an angle. The angle iron 12 is positionable with the inner surface facing the mounting aperture 14 of the spare tire 16.

The padlock 20 is coupled with respect to the angle iron 12. The padlock 20 includes a shackle portion 22 and a locking portion 24. The shackle portion 22 has an inverted U-shaped configuration defined by a pair of vertical segments and an arched upper segment 26. The pair of vertical segments each have lower ends. The lower end of a first vertical segment 28 is fixedly coupled to the locking portion 24. The lower end of a second vertical segment 30 is removably coupled with the locking portion 24. The first vertical segment 28 is secured to the inner surface 18 of the angle iron 12. This securement is accomplished via a weld 31. The padlock 20 is extendable through the mounting aperture 14 of the spare tire 16 with the second vertical segment 30 extending through the aperture 32 of the mounting bracket 34 for securing to the mounting bracket 34 in a locked orientation.

In use, once the spare tire 16 has been mounted to the mounting bracket 34, the angle iron 12 will be positioned over the mounting aperture 14. The padlock 20, which is unlocked, is extended through the mounting aperture 14 and the second vertical segment 30 is passed through the aperture 32 of the mounting bracket after which it is coupled with the locking portion 24 to lock the angle iron 12 in place and prevent the removal of the spare tire 16 without first unlocking the padlock 20.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A rear mounted spare tire lock preventing the theft of a spare tire that is mounted on a back of a vehicle, the spare tire being mounted to the back of the vehicle through a mounting bracket, the spare tire having a central mounting aperture, the mounting bracket having an aperture that aligns with the central mounting aperture, the rear mounted spare tire lock comprising, in combination:

an angle iron positioned over the mounting aperture of the spare tire, the angle iron having an inner surface and an outer surface, the inner surface defining an interior of an angle, the outer surface defining an exterior of an angle, the angle iron being positioned with the inner surface facing the mounting aperture of the spare tire;

a padlock coupled with respect to the angle iron, the padlock including a shackle portion and a locking portion, the shackle portion having an inverted U-shaped configuration defined by a pair of vertical segments and an arched upper segment, the pair of vertical segments each having lower ends, the lower end of a first vertical segment being fixedly coupled to the locking portion, the lower end of a second vertical segment being removably coupled with the locking portion, the first vertical segment being secured to the inner surface of the angle iron, the padlock being extended through the mounting aperture of the spare tire with the second vertical segment extending through the aperture of the mounting bracket for securing to the mounting bracket in a locked orientation.

2. A rear mounted spare tire lock preventing the theft of a spare tire that is mounted on a back of a vehicle, the spare tire being mounted to the back of the vehicle through a mounting bracket, the spare tire having a central mounting aperture, the mounting bracket having an aperture that aligns with the central mounting aperture, the rear mounted spare tire lock comprising, in combination:

an angle iron positioned over the mounting aperture of the spare tire;

a padlock coupled with respect to the angle iron, the padlock including a shackle portion secured to and extending inwardly of an inner surface of the angle iron and a locking portion, the padlock extending through the mounting aperture of the spare tire and extending through the aperture of the mounting bracket for securing to the mounting bracket in a locked orientation.

* * * * *